United States Patent
Cormier

(10) Patent No.: US 10,509,869 B2
(45) Date of Patent: Dec. 17, 2019

(54) SYSTEM AND METHOD FOR HEURISTIC PREDICTIVE AND NONPREDICTIVE MODELING

(71) Applicant: Baker Street Scientific Inc., Rome, GA (US)

(72) Inventor: Paul Cormier, Raleigh, NC (US)

(73) Assignee: Baker Street Scientific Inc., Rome, GA (US)

(*) Notice: Subject to any disclaimer, the term of this patent is extended or adjusted under 35 U.S.C. 154(b) by 383 days.

(21) Appl. No.: 15/265,852

(22) Filed: Sep. 15, 2016

(65) Prior Publication Data
US 2017/0076023 A1 Mar. 16, 2017

Related U.S. Application Data

(60) Provisional application No. 62/218,700, filed on Sep. 15, 2015.

(51) Int. Cl.
*G06F 7/60* (2006.01)
*G06F 17/10* (2006.01)
*G06F 17/50* (2006.01)

(52) U.S. Cl.
CPC ...... *G06F 17/5009* (2013.01); *G06F 2217/04* (2013.01)

(58) Field of Classification Search
None
See application file for complete search history.

(56) References Cited

U.S. PATENT DOCUMENTS

| | | | |
|---|---|---|---|
| 8,041,808 B1* | 10/2011 | Becker | G06F 11/3442 702/179 |
| 8,417,715 B1* | 4/2013 | Bruckhaus | G06F 17/30994 707/758 |
| 2005/0234697 A1* | 10/2005 | Pinto | G06Q 10/06 703/22 |
| 2009/0006295 A1* | 1/2009 | Angell | G06K 9/00335 706/21 |
| 2011/0071970 A1* | 3/2011 | Massie | H02J 3/00 706/21 |
| 2012/0323926 A1* | 12/2012 | Nath | G06N 7/005 707/741 |
| 2013/0024173 A1* | 1/2013 | Brzezicki | G06N 7/005 703/6 |
| 2014/0101076 A1* | 4/2014 | Martin | G06N 99/005 706/11 |

\* cited by examiner

*Primary Examiner* — Cedric Johnson
(74) *Attorney, Agent, or Firm* — Marin Patents LP; Gustavo Marin

(57) ABSTRACT

A network-connected predictive modeling computer comprising at least a memory and a processor and further comprising programmable instructions stored in the memory and operating on the processor, the instructions adapted to a system for predicting events, outcomes, locations, items and more, across a broad variety of applications. A preferred embodiment of the invention interfaces to a plurality of user devices associated to a plurality of Subject Matter Experts (SME) as input to compute automatic predictive intelligence models. In a preferred embodiment of the invention a combination of subject matter expertise and insight are combined by a plurality of computing devices with raw or machine-learned data to create a predictive intelligence model that exceeds accuracy and confidence in results that may be achieved by individual participants or by computation alone.

15 Claims, 19 Drawing Sheets

{HAPM Model Name}
Analyst Relative Weighting — 512

John Brown — 513

0%  25%  50%  75%  100%

Sue Jones — 513

0%  25%  50%  75%  100%

Bill Smith — 513

0%  25%  50%  75%  100%

Jane Rogers — 513

0%  25%  50%  75%  100%

SYSTEM AND METHOD FOR HEURISTIC PREDICTIVE AND NONPREDICTIVE MODELING

CROSS REFERENCE TO RELATED APPLICATIONS

This application claims the benefit of, and priority to, U.S. provisional application 62/218,700 titled, "METHODS, SYSTEMS, AND COMPUTER PROGRAM PRODUCTS FOR ENHANCING THE QUALITY OF PREDICTIVE OUTCOMES WHEN SUBJECT MATTER EXPERTS (SMEs) MAKE CHOICES AMONG COMPLEX ALTERNATIVES USING MULTI-ATTRIBUTE COMPOSITIONAL MODELS. THIS ALLOWS THE SYSTEM TO DETERMINE LIKELIHOOD AND CONFIDENCE IN PREDICTIVE RESULTS. THE SOFTWARE MELDS MACHINE PROCESSED DATA AND EXPERT HUMAN INTUITION TO OBTAIN BETTER RESULTS THAN EITHER MACHINE OR HUMAN COULD OBTAIN INDIVIDUALLY" filed on Sep. 15, 2015, the entire specification of which is incorporated herein by reference.

BACKGROUND

Field of the Invention

The disclosure as detailed herein is in the technical field of data analytics. More specifically, the present disclosure relates to the technical field of predictive modeling.

Description of Related Art

There exists a consistent need for reliable predictive data across a variety of applications, such as but not limited to the following: maintaining national security; forecasting financial markets, political outcomes and retail trends; and furthering scientific advancements through the processing of mass amounts of data. There currently exist several tools and techniques that permit the automated analysis of data to determine or predict certain future outcomes. These typically use statistical techniques and machine learning algorithms to create predictive models based on collected data. As close as we would like to say that these techniques come to mimicking the human brain; there is no hardware or software that can effectively emulate the subtle insights and intuition that a human Subject Matter Expert (SME) possesses.

It is thought that a preferred embodiment of the invention may improve the well-being of multiple types of people and entities, including but not limited to: military analysts, financial analysts, data scientists, molecular biologists, retail analysts, risk analysts, political analysts, and forecasting organizations. For example, instances of threats to national security are a major concern for governments, politicians, and military analysts. Determining the likelihood and viability of such a threat requires information, expediency, and resources, as well as a level of insight and accuracy that many singular entities do not possess.

In the field of finance, there are numerous instances of analysts making bad forecasts which result in a financial loss for individuals, schools, banks, and other clients. Therefore, it is important that analysts are able to accurately assess information to predict market trends in order to assess the future performance of stocks and investments, and to provide quality guidance to their clients. The addition of inputs from subject matter experts to machine learning will improve the effectiveness of prediction.

For all manner of scientists, data are essential to research and study. It is well known that there is a reliance on machine learning for model creation. Traditional machine learning relies heavily on "training data", which are too much for humans alone to create a workable model and to analyze. In this regard, having a better way for scientists to synthesize and analyze data would result in increased productivity in research and scientific advancement.

SUMMARY OF THE INVENTION

A preferred embodiment of the invention is a system that can be used to effectively model events and more effectively predict events, outcomes, locations, items, and more, across a broad variety of applications. A preferred embodiment of the invention leverages the insight and intuition of human Subject Matter Experts (SME) to build a predictive intelligence model. A preferred embodiment of the invention combines insight from subject matter expertise as input from user devices and raw or machine learned data to create a predictive intelligence model that exceeds the accuracy and confidence in the results that may be achieved by individual participants or by computation alone.

A preferred embodiment of the invention differs from traditional Multi-Criteria Decision Making (MCDM) predictive modeling techniques in two ways: (1) provides an improvement over systems known in the art whereby a likelihood may be based on a scale (for example, normal & alert threshold lines that may indicate an actual actionable likelihood. It can be appreciated by one with ordinary skill in the art that the current art may rank-order outcomes, but not provide a scale of likelihood, (2) it leverages SME insight and intuition to build a predictive intelligence model and can create an effective model without relying on any training data, and (3) an ability to fit into either real-time workflows (for example, incoming sensor data) to produce real-time results, or to fit into post-analysis, or long-term workflows. (for example, "which airports are expected to have the longest delays this upcoming holiday season?")

This system comprises a model creation module, an attribute creation module, a collected attributes module, an analyst relative importance module, and a target scenario model module which are operably connected to a network for creation of a target model.

An embodiment of the invention allows one to generate a prediction quickly from real-time data. Yet another embodiment of the invention allows the system to forecast the likelihood of events occurring. Yet another embodiment of the invention allows the system to forecast an evaluation of places or entities (or both). Yet another embodiment of the invention allows one to create prediction models based on collected data.

Yet another embodiment of the invention allows one to merge existing data sets to be used more effectively. Yet another embodiment of the invention allows one to increase the effectiveness of machine learning. Yet another embodiment of the invention allows one to quantify or formalize experience into a predictive model creation. Yet another embodiment of the invention allows one to easily weight the relative value of different data and/or data sources for predicting results of a scenario. An additional embodiment allows one to minimize the reliance on machine learning for prediction and analysis.

DETAILED DESCRIPTION

Figure 1:
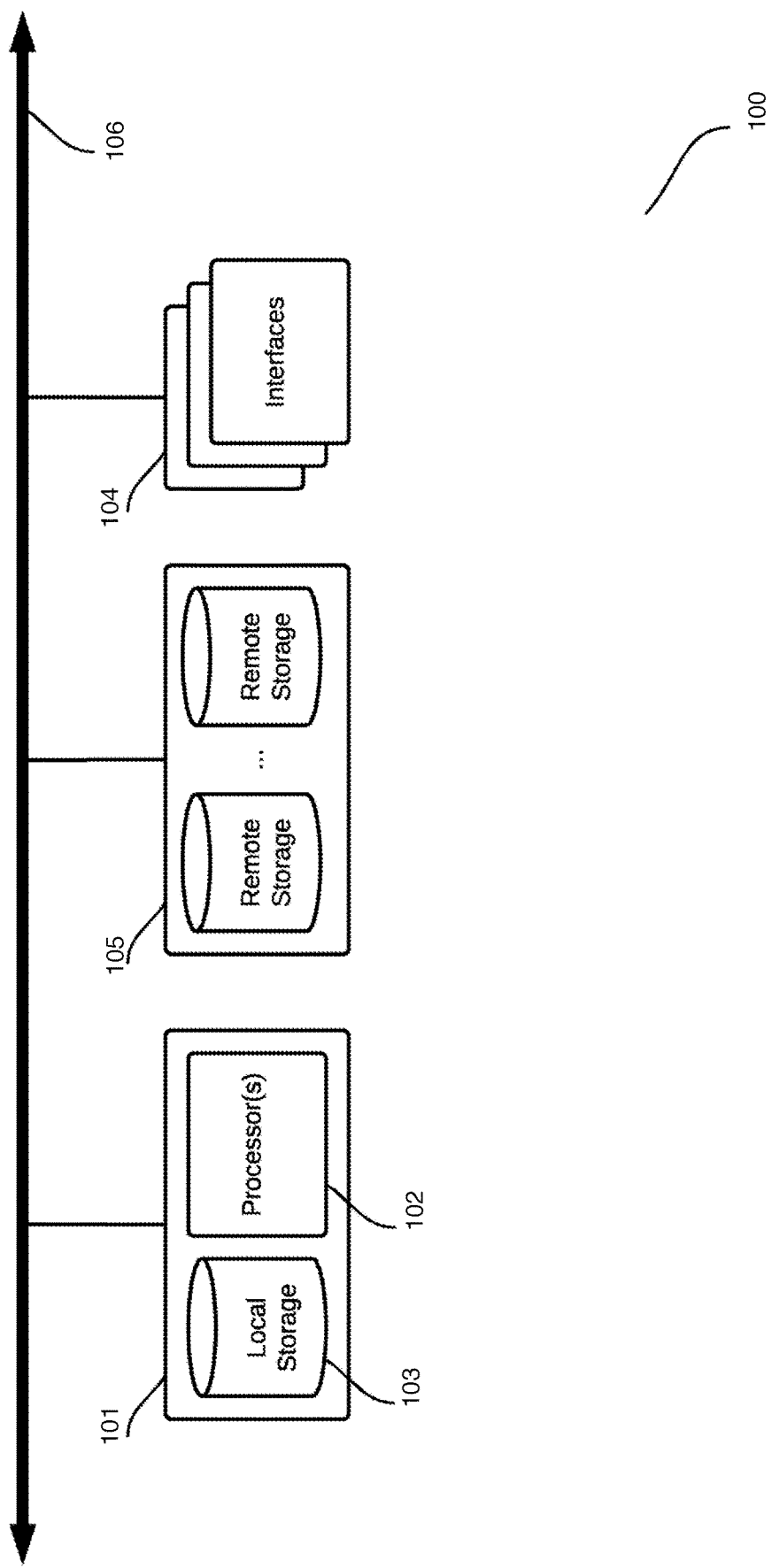
FIG. 1 is a diagram view which shows an exemplary hardware architecture of a computing device used in an embodiment of the invention.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, is an exemplary hardware architecture of a computing device used in an embodiment of the invention. Computing device 100 comprises an electronic device capable of executing software- or hardware-based instructions according to one or more programs stored in memory. In some embodiments, examples of computing device 100 may include: desktop computers, carputers, game consoles, laptops, notebooks, a palmtop, a tablet, smartphones, smartbooks, or a server system utilizing CPU, local memory and/or remote memory, and interface(s). In some embodiments, computing device 100 serves to communicate with a plurality of other computing devices, such as clients or servers, over communications networks. Computing device 100 preferably comprises (but is not limited to) one or more CPU 101, one or more interface 104, one or more NIC, one or more busses, one or more memory 200, one or more nonvolatile memory 400, one or more storage devices 201, one or more input devices 202, one or more input output units 401, one or more operating systems 203, one or more output devices 204, one or more real time clock 402, and one or more power supply 403. CPU 101 (as in FIG. 1) comprises a unit responsible for implementing specific functions associated with the functions of a specifically configured computing device or machine. In some embodiments, examples of CPU 101 may include: a system-on-a-chip (SOC) type hardware, a Qualcomm SNAP-DRAGON™, or a Samsung EXYNOS™ CPU. In some embodiments, CPU 101 serves to perform one or more of the different types of functions and/or operations under the control of software modules or components, which for example, may include an operating system and any appropriate applications software, drivers, and the like. In yet other embodiments, CPU 101 may also serve to run software that carry out one or more functions or applications of embodiments of the invention. Additionally, in other embodiments, CPU 101 serves to carry out computing instructions under control of an operating system. CPU 101 preferably comprises one or more processor 102 and one or more local memory 103. In some embodiments, examples of processor 102 may include: an Intel processor, an ARM processor, a Qualcomm processor, an AMD processor, application-specific integrated circuits (ASICs), electrically erasable programmable read-only memories (EEPROMs), field-programmable gate arrays (FPGAs), a mobile processor, a microprocessor, a microcontroller, a microcomputer, a programmable logic controller, or a programmable circuit.

Local memory 103 comprises one or more physical devices used to store programs (sequences of instructions) or data (e g. program state information) on a temporary or permanent basis for use in a computer or other digital electronic device, which may be configured to couple to the system in many different configurations. In some embodiments, examples of local memory 103 may include: nonvolatile random access memory (RAM), read-only memory (ROM), or a one or more levels of cached memory. In some embodiments, local memory 103 serves to cache and/or store data. In other embodiments, local memory 103 may also serve to store programming instructions. Interface 104 (as in FIG. 1) comprises a mechanism to control the sending and receiving of data packets over a computer network or support peripherals used with computing device 100. In some embodiments, examples of interface 104 may include: network interface cards (NICs), Ethernet interfaces, frame relay interfaces, cable interfaces, DSL interfaces, token ring interfaces, graphics interfaces, universal serial bus (USB) interfaces, Serial port interfaces, Ethernet interfaces, FIREWIRE™ interfaces, THUNDERBOLT™ interfaces, PCI interfaces, parallel interfaces, radio frequency (RF) interfaces, BLUETOOTH™ interfaces, near-field communications interfaces, 802.11 (WiFi) interfaces, frame relay interfaces, TCP/IP interfaces, ISDN interfaces, fast Ethernet interfaces, Gigabit Ethernet interfaces, Serial ATA (SATA) or external SATA (eSATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, or fiber data distributed interfaces (FDDIs). Interface 104 preferably comprises one or more physical ports, one or more independent processor, and one or more interface memory. Communications network 106 comprises a communications network that allows computers to exchange data using known protocols. In some embodiments, examples of communications network 106 may include: a personal area network, a wireless personal area network, a near-me area network, a local area network, a wireless local area network, a wireless mesh network, a wireless metropolitan area network, a wireless wide area network, a cellular network, a home area network, a storage area network, a campus area network, a backbone area network, a metropolitan area network, a wide area network, an enterprise private network, a virtual private network, an intranet, an extranet, an Internetwork, an Internet, near field communications, a mobile telephone network, a CDMA network, GSM cellular networks, or a WiFi network. Remote memory 105 comprises a service that provides users with a system for the backup, storage, and recovery of data.

Figure 2:
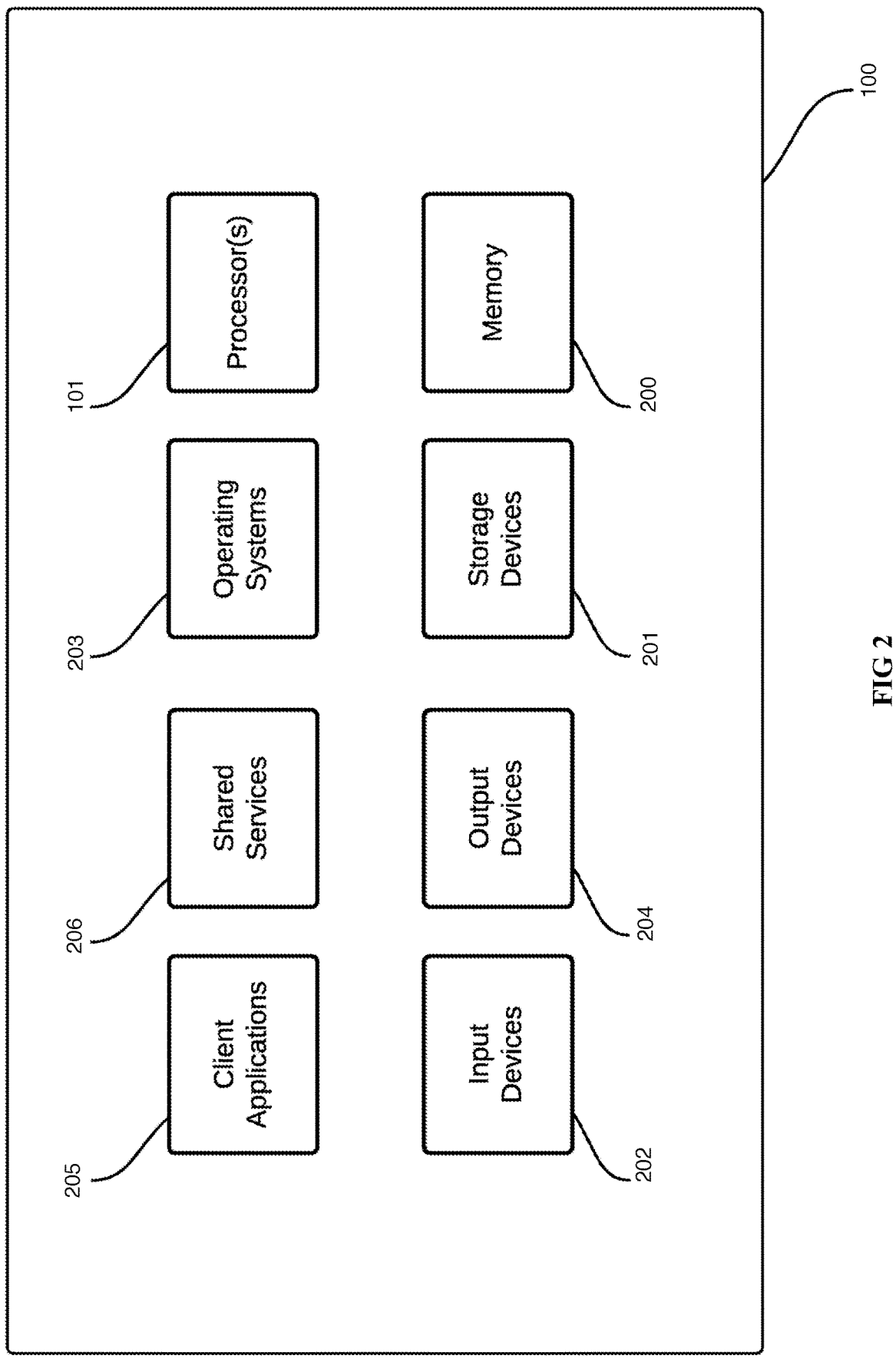
FIG. 2 is a diagram view which shows an exemplary logical architecture for a client device, according to an embodiment of the invention.

Referring now to FIG. 2, is an exemplary logical architecture for a client device, according to an embodiment of the invention. Memory 200 comprises mechanism designed to store program instructions, state information, and the like for performing various operations described herein, may be storage devices 201, in some embodiments. In some embodiments, examples of memory 200 may include: read-only memory (ROM), read-only memory devices (ROM), a memristor memory, random access memory (RAM), or RAM hardware modules. In some embodiments, memory 200 serves to cache and/or store data. In yet other embodiments, memory 200 may also serve to store program instructions. In yet other embodiments, memory 200 may also serve to store program instructions for the general-purpose network operations. In yet other embodiments, memory 200 may also serve to store information relating to the functionality of the system. In yet other embodiments, memory 200 may also serve to store data structures. In yet other embodiments, memory 200 may also serve to store configuration data. In yet other embodiments, memory 200 may also serve to store encryption data. In yet other embodiments, memory 200 may also serve to store historical system operations information. Additionally, in other embodiments, memory 200 serves to store generic non-program information. Operating systems 203 (as in FIG. 2) comprises system software that manages computer hardware and software resources and provides common services for computer programs. In some embodiments, examples of operating systems 203 may include: Microsoft's WINDOWS™, Apple's Mac OS/X, iOS operating systems, Linux operating system, or Google's ANDROID™ operating system. Input devices 202 comprises device of any type suitable for receiving user input. Input devices 202 preferably comprises one or more keyboard 300, one or more touchscreen, one or more microphone, mouse 301, a touchpad or trackball.

Output devices 204 comprises device of any type suitable for outputting computing device 100 related information. In some embodiments, examples of output devices 204 may include: a screens for visual output, speakers, or printers. In some embodiments, output devices 204 may comprise one or more data objects for the programmatic use of the one or more data objects by a plurality of other computing devices. In this regard, data objects may be presented as, but limited to, an application programming interface (API), web services (for example, XML, SOAP, WSDL and UDDI open standards over an Internet protocol backbone), or other sets of subroutine definitions, protocols, and programmatic tools (or any combination thereof). Storage devices 201 comprises mechanism designed to store information which in some embodiments may be memory 200. In some embodiments, examples of storage devices 201 may include: magnetic media, hard disks, floppy disks, a magnetic tape, optical media, CD-ROM disks, magneto-optical media, optical disks, a flash memory, solid state drives (SSD), "hybrid SSD" storage drives, swappable flash memory modules, thumb drives, hot-swappable hard disk drives, solid state drives, removable optical storage discs, or an electrical storage device. Shared services 206 comprises web-enabled services or functionality related to computing device 100.

Figure 3:
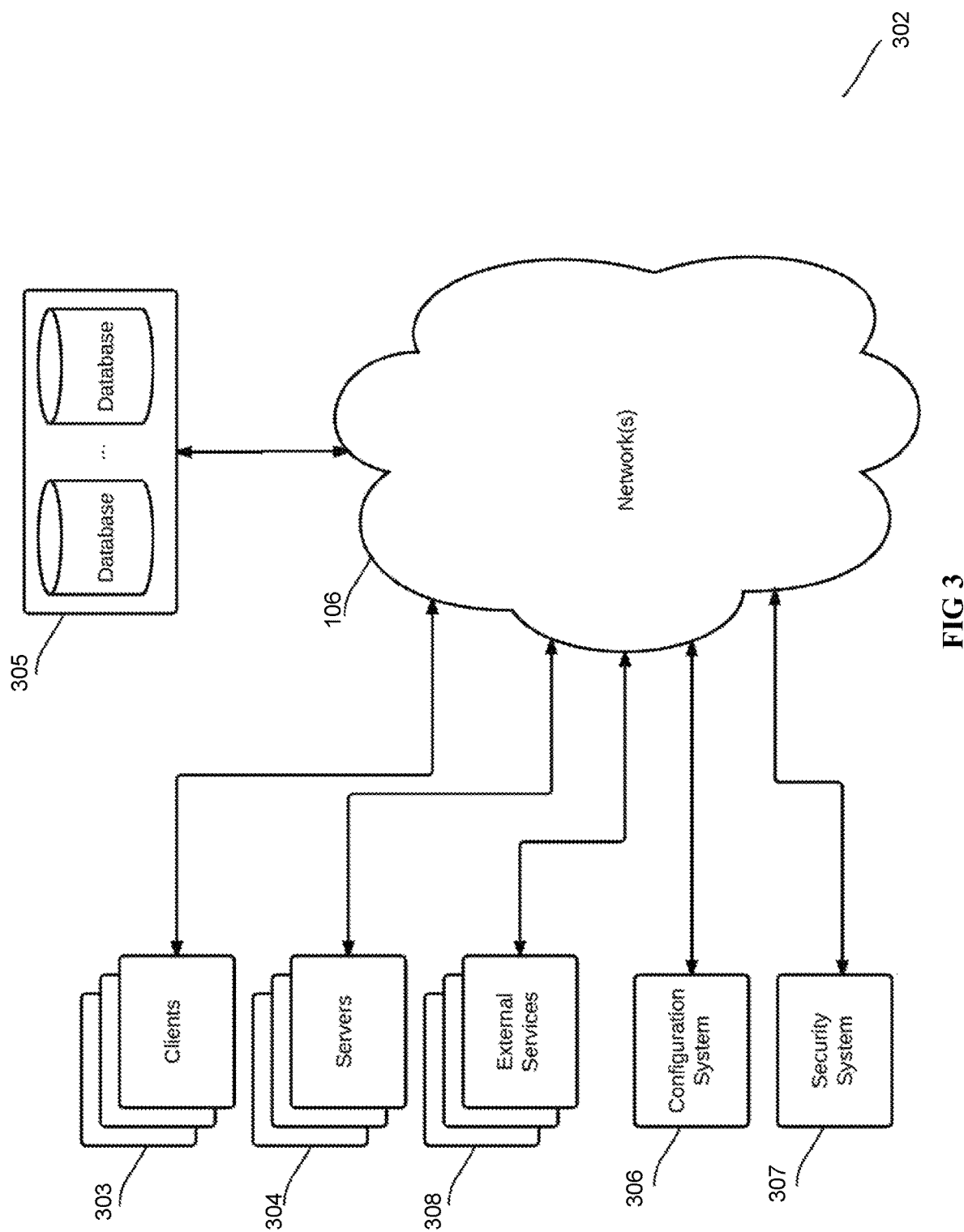
FIG. 3 is a diagram view which shows an exemplary architectural arrangement of clients, servers, and external services, according to an embodiment of the invention.

Referring now to FIG. 3, is an exemplary architectural arrangement of clients, servers, and external services, according to an embodiment of the invention. Client 303 comprises one or more computing device 100 with program instructions for implementing client-side portions of the present system which in some embodiments, may be connected to communications network 106. Server 304 comprises computing device 100 configured to handle requests received from one or more client 303 over communications network 106. In some embodiments, server 304 serves to call one or more external services when needed to obtain additional information, or to refer to additional data concerning a particular call. Configuration system 306 comprises a system common to information technology (IT) and web functions that implements configurations or management system. Database 305 comprises an organized collection of data within a programs instruction related system, designed to allow the definition, creation, querying, update, and administration of databases. In some embodiments, examples of database 305 may include: a relational database system, a NoSQL system, a Hadoop system, a Cassandra system, a Google BigTable, column-oriented databases, in-memory databases, or clustered databases. Distributed computing network 302 comprises any number of client 303 and/or server 304 operably connected to communications network 106 for the purposes of implementing the system. Distributed computing network 302 preferably comprises one or more client application 205, one or more client 303, one or more server 304, one or more external service, one or more shared services 206, one or more database 305, one or more security system, and configuration system 306.

Figure 4:
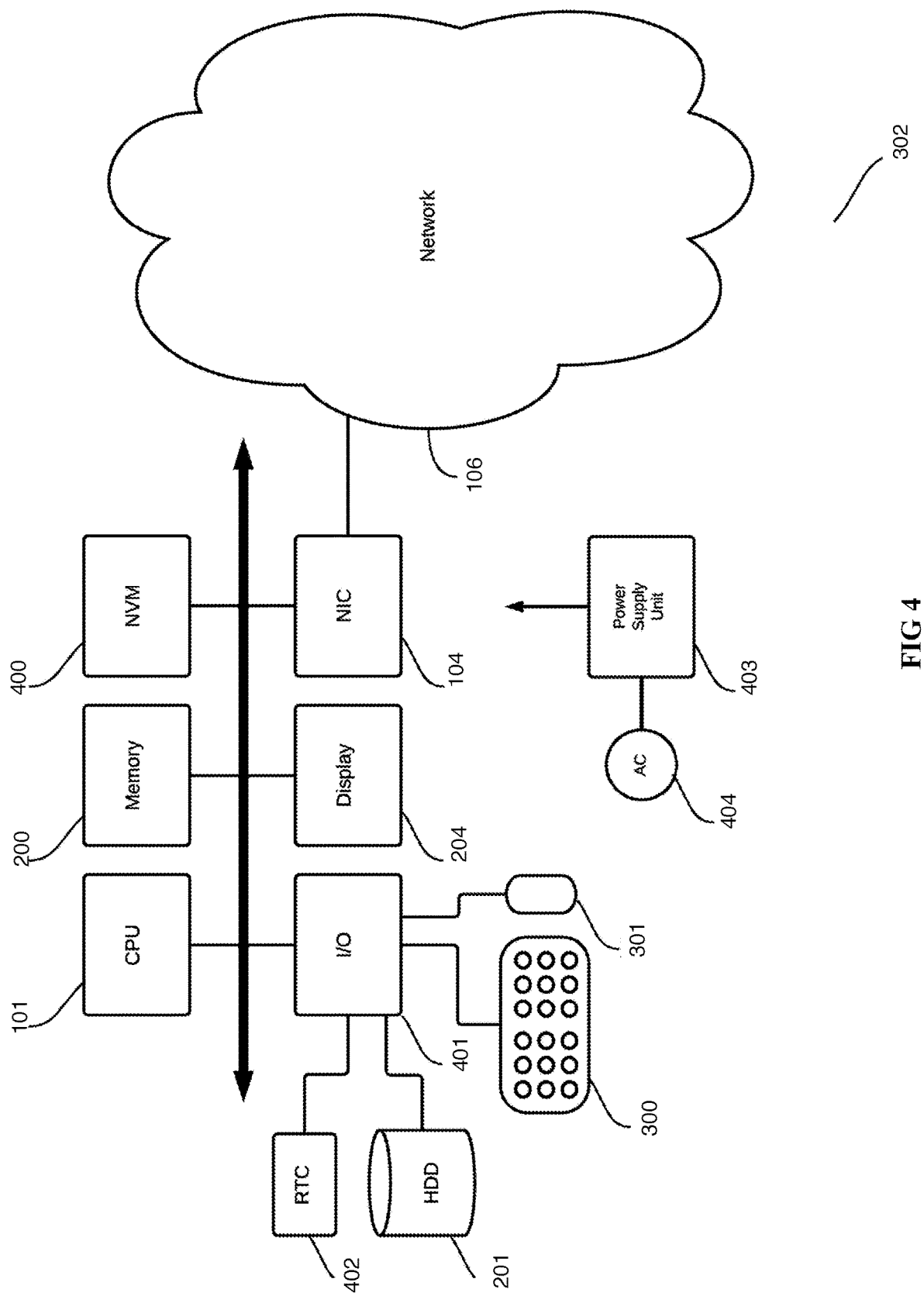
FIG. 4 is a diagram view which shows an embodiment of a hardware architecture of a computing device used in various embodiments of the invention.

Referring now to FIG. 4, an embodiment of a hardware architecture of a computing device used in various embodiments of the invention. Nonvolatile memory 400 comprises computer memory 200 that can retrieve stored information even after having been power cycled (turned off and back on). Real time clock 402 comprises a computer device clock (most often in the form of an integrated circuit) that keeps track of the current time. Input output units 401 comprises devices used by a human (or other system) to communicate with a computer. Power supply 403 comprises an electronic device that supplies electric energy to an electrical load. Power supply 403 preferably comprises one or more power source 404. In some embodiments, an example of power source 404 could be an AC power or a DC power and the like.

Figure 5:
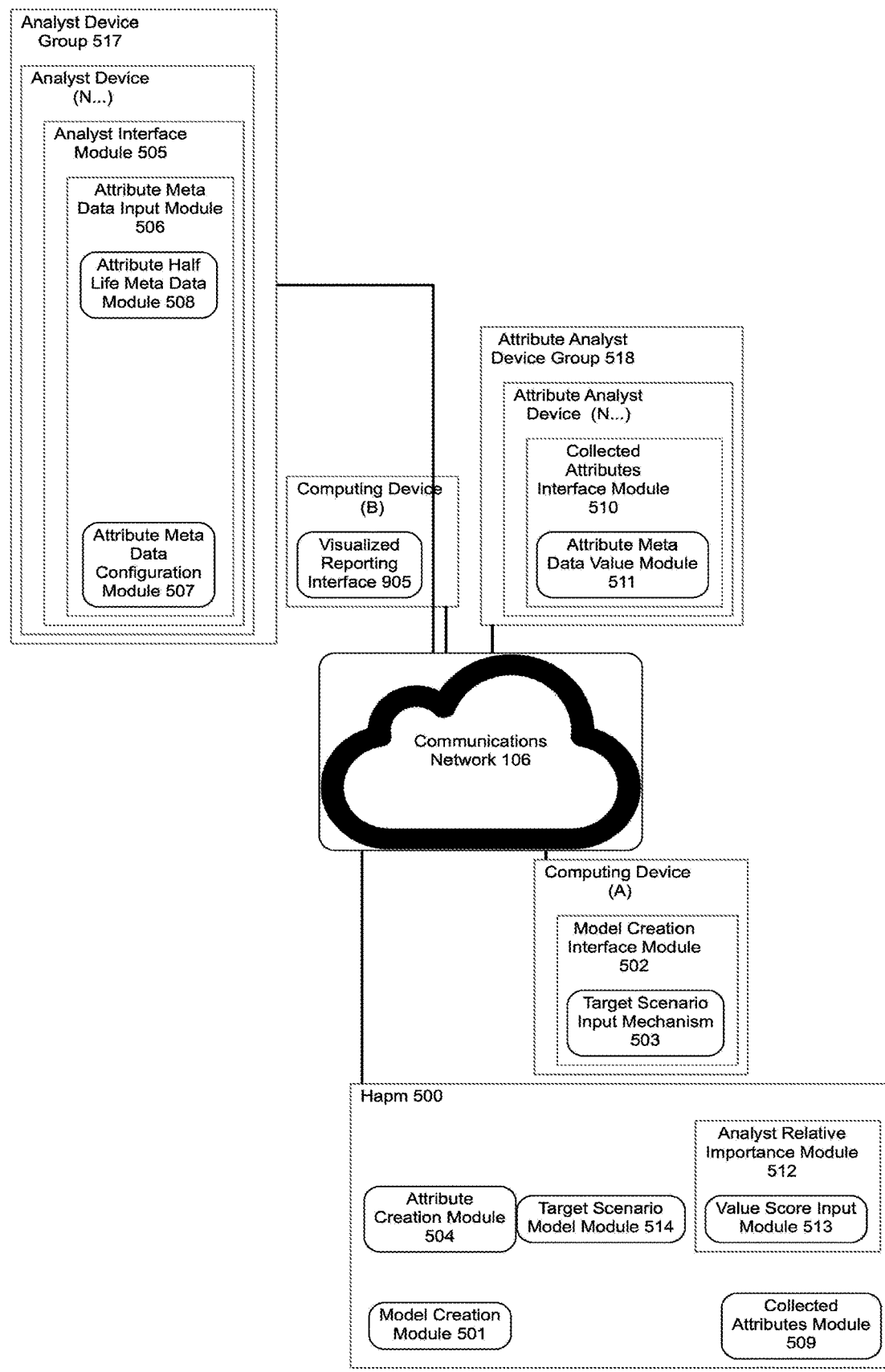
FIG. 5 is a diagram view which shows overall system architecture.

FIG. 5 is an embodiment of the overall system architecture. HAPM 500 is a Heuristic Assisted Predictive Modeling (HAPM) system for predicting the likelihood of one of n number of outcome for a target scenario comprising a plurality of modules, where the plurality of modules may exist on or one more computing devices 100 or services operably connected to distributed computing network 302. HAPM 500 preferably comprises model creation module 501, attribute creation module 504, collected attributes module 509, analyst relative importance module 512, and target scenario model module 514. Model creation module 501 may comprise programming instructions that manages the creation and/or configuration of a target scenario object. Model creation module 501 preferably comprises model creation interface module 502. Attribute creation module 504 may comprise programming instructions that manages the creation and/or configuration of a one or more attribute to a target scenario object. Attribute creation module 504 preferably comprises analyst interface module 505.

Figure 16:
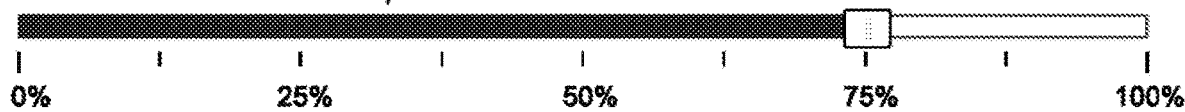
FIG. 16 is a wireframe view which shows a preferred interface module for weighting attribute analysts strength relative to one another, used in some embodiments.
Figure 16:
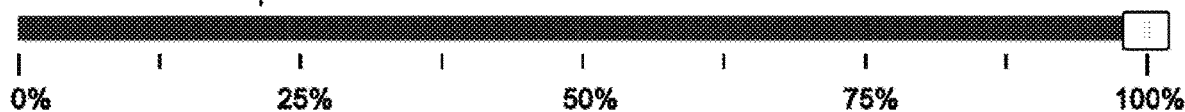
Figure 16:
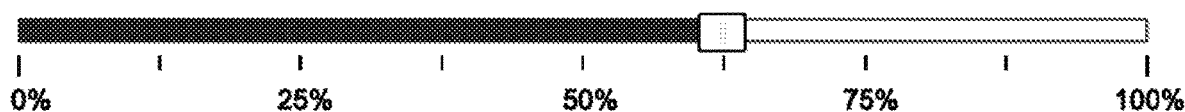
Figure 16:
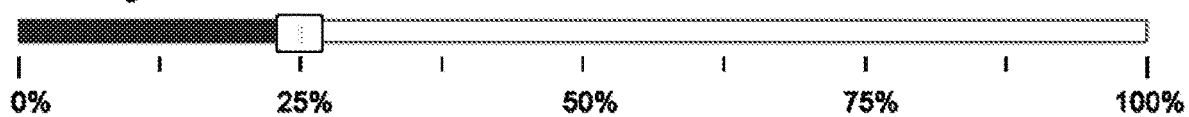

Collected attributes module 509 may comprise one or more modules for one or more attribute analyst devices that allows them to assign metadata values to metadata, such as relative importance, nominal value, alert value, and/or a half-life value, or other parameters for configuration with a target scenario object. Collected attributes module 509 preferably comprises collected attributes interface module 510 and collective attribute evaluation set 700 (as in FIG. 7). Analyst relative importance module 512 (also in FIG. 16) may comprise one or more interface, processing, or connection modules that can be operated for denoting the relative weight of the strength of the valuation of one or more attribute analyst device 515. Analyst relative importance module 512 preferably comprises value score input module 513 (also seen in FIG. 16), which in some embodiments, is an input mechanism to assign the relative weight of the attribute analyst inputs. Target scenario model module 514 may comprise programming instructions that create a target scenario model and a target scenario schema from a target scenario object. referring now to FIG. 9, Target scenario model module 514 preferably comprises data source aggregation module 900, target scenario schema module 901, target scenario result set 902, target scenario model creator module 903, and target scenario result module 904.

Referring again to FIG. 5, model creation interface module 502 comprises an interface for model creation module 501. Model creation interface module 502 preferably comprises Target scenario input mechanism 503. Target scenario input mechanism 503 may comprise an input mechanism on model creation interface module 502 for a target scenario.

Figure 17:
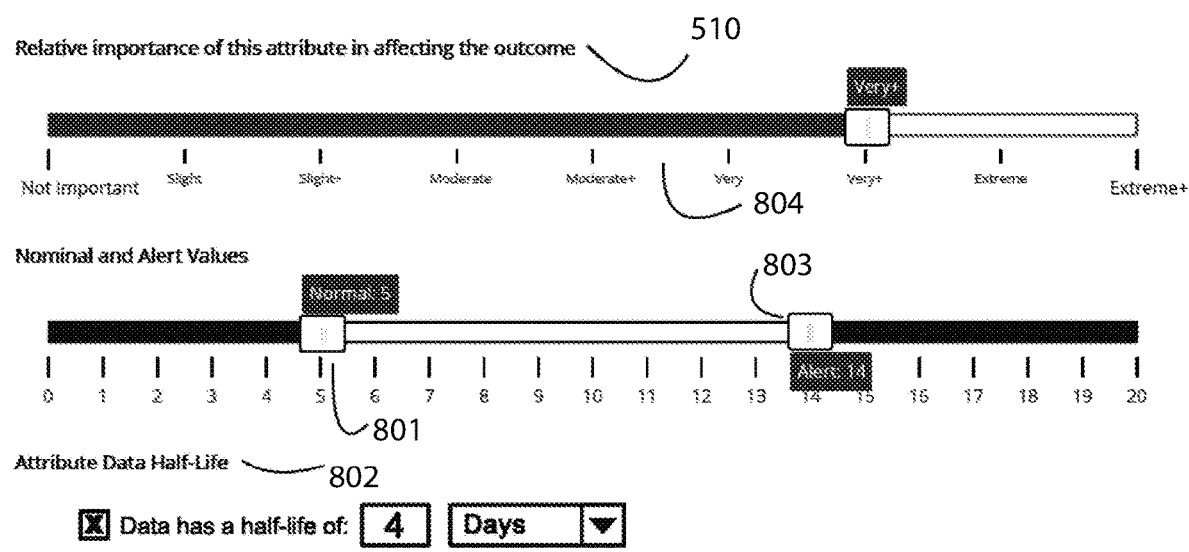
FIG. 17 is a wireframe view which shows a preferred interface module for attribute analysts to value attributes, used in some embodiments.

Attribute analyst device group 518 may comprise one or more attribute analyst device 515. Attribute analyst device 515 comprises a computer device used to set the value of a metadata of one or more attribute configured to a target scenario object. Collected attributes interface module 510 (also seen in FIG. 17) comprises an interface module for collected attributes module 510.

Figure 8:
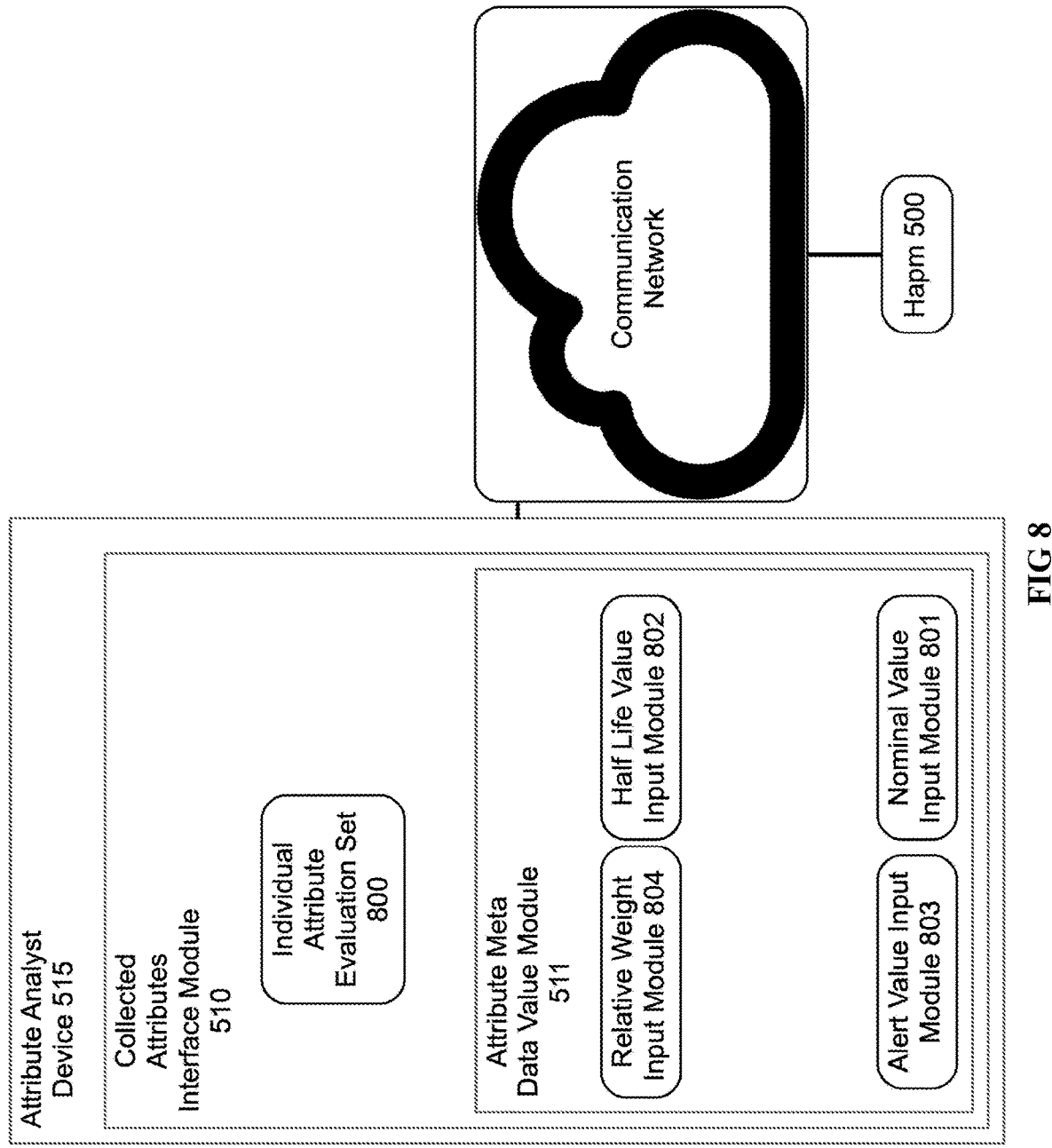
FIG. 8 is a diagram view which shows relationships between modules within an attribute analyst device and the system.

Referring now to FIG. 8, collected attributes interface module 510 preferably comprises individual attribute evaluation set 800 and attribute metadata value module 511. Attribute metadata value module 511 may comprise programming instructions to allow input for values of metadata for an attribute that can be configured to a target scenario object. Attribute metadata value module 511 preferably comprises nominal value input module 801, half-life value input module 802, alert value input module 803, and a relative weight input module 804.

Referring again to FIG. 5, analyst device group 517 may comprise one or more analyst device 516. Analyst device 516 comprises a computer device that creates the attributes that are subsequently configured to a target scenario object. Analyst interface module 505 may comprise an interface for attribute creation module 504. Analyst interface module 505 preferably comprises attribute metadata input module 506. Attribute metadata input module 506 may comprise an input mechanism on analyst interface module 505 for association for data to a target scenario object. Attribute metadata input module 506 preferably comprises attribute metadata configuration module 507 and attribute half-life metadata module 508. Attribute metadata configuration module 507 may comprise programming instructions of analyst device 516 that allows the designation of the types of data an attribute represents. For example, for the scenario "What are the chances there is a terrorist attack during weekend NFL games?" an attribute such as "Rainfall amount".

Figure 6:
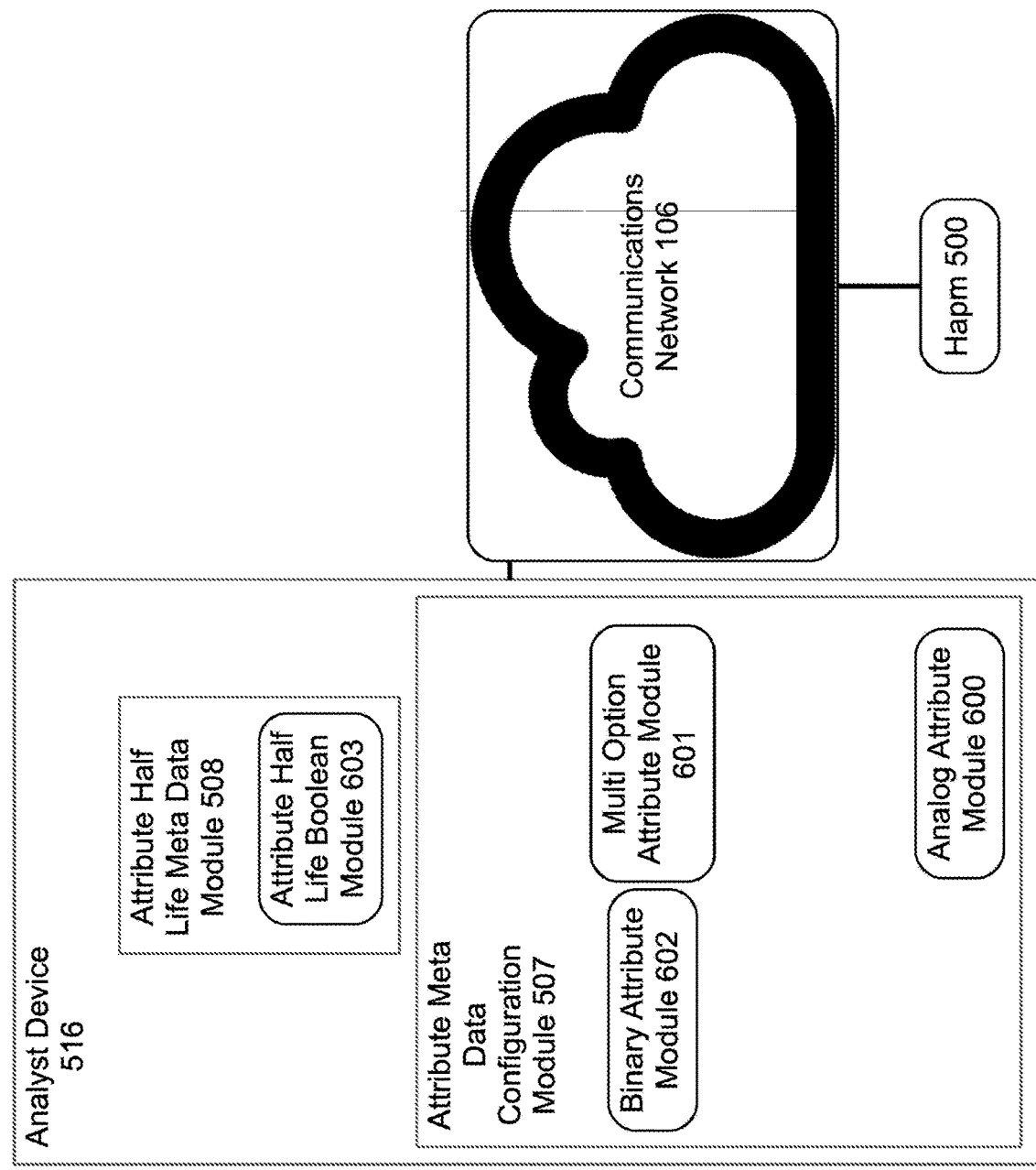
FIG. 6 is a diagram view which shows relationships between modules within an analyst device and the system.

Referring now to FIG. 6, 2 is an embodiment of the relationships between modules within an analyst device and the system. Attribute metadata configuration module 507 preferably comprises analog attribute module 600, multi-option attribute module 601, and binary attribute module 602. Attribute half-life metadata module 508 may comprise an input mechanism for designating elapsed time or a future time upon which the attribute value (designated in an attribute configuration module) would be about half as valuable in the algorithm for the target scenario model. For example, if the attribute is rainfall amount the half-life value would be +/−3 hrs. Attribute half-life metadata module 508 preferably comprises attribute half-life Boolean module 603.

Analog attribute module 600 comprises an input mechanism for an attribute that can be denoted with an absolute range designation and whose value can be assigned within a min and max value. Attribute half-life Boolean module 603 comprises an input mechanism for designating the presence or absence of half-life metadata. Binary attribute module 602 comprises an input mechanism that allows analyst device 516 to define an attribute that is designated as true/false. Multi-option attribute module 601 comprises an input mechanism that allows analyst device 516 to define the possible values that are allowed for a multi-option attribute. For Example: Day of the week: may be (Monday, Thu, Sun, Sat).

Figure 7:
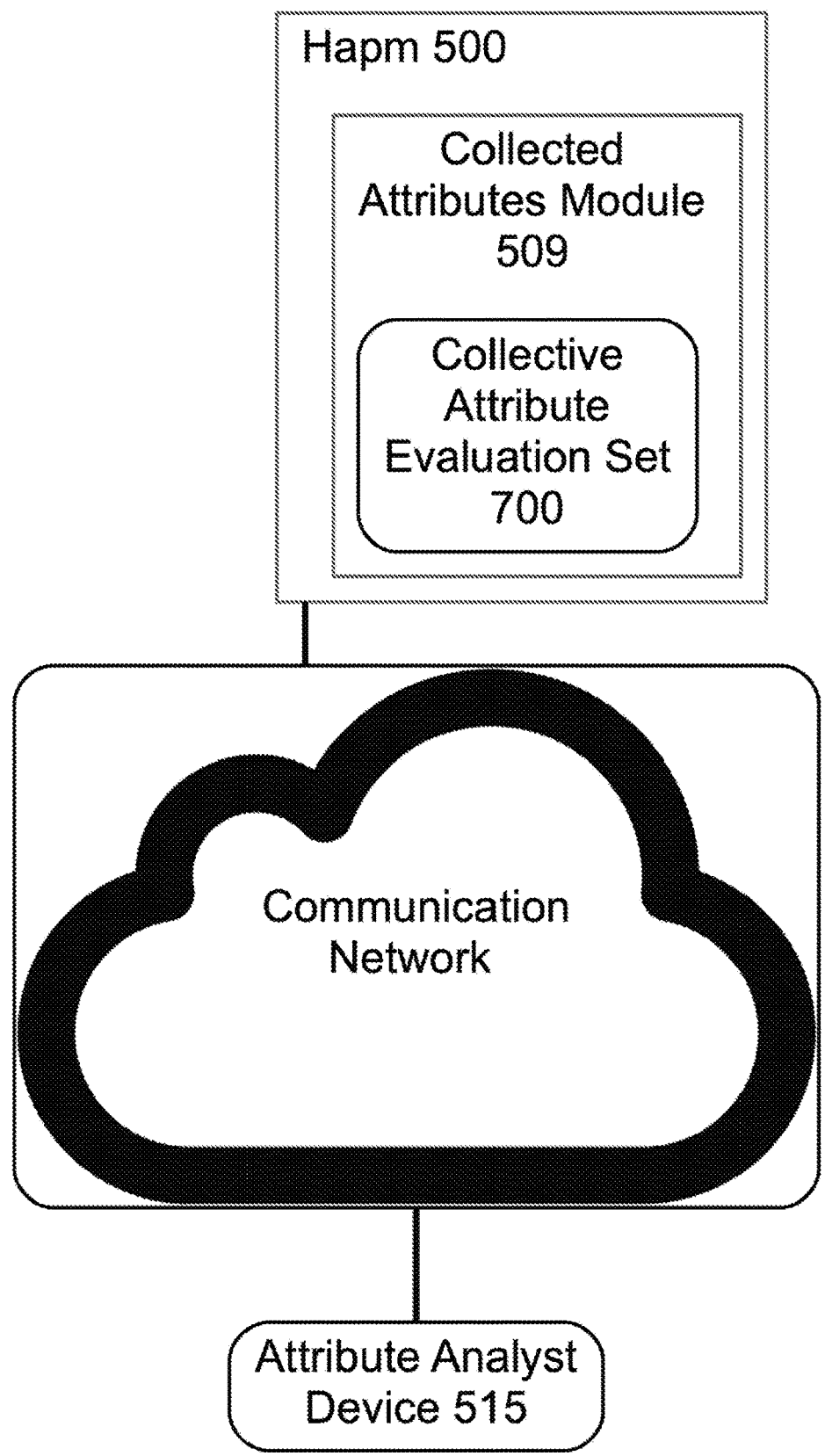
FIG. 7 is a diagram view which shows relationships between modules for attribute analysts existing on the device and system.

Referring now to FIG. 7, demonstrating an embodiment of the relationships between modules for attribute analysts existing on the device and system. Collective attribute evaluation set 700 (as in FIG. 7) comprises one or more individual attribute evaluation set 800.

Referring now to FIG. 8, FIG. 8 is an embodiment of the relationships between modules within an attribute analyst device and the system. Individual attribute evaluation set 800 comprises a collection of all the value assignments for the attributes by attribute analyst device 515, For example, one analyst device has submitted 13 different values for 13 attributes that are configured to a target scenario object. Nominal value input module 801 (also seen in FIG. 17) comprises an input mechanism for attribute analyst device 515 designating a specific value of an attribute used for configuration to a target scenario object. For example, an expected normal value of "tweets/day" may be 50. Half-life value input module 802 (also seen in FIG. 17) comprises an input mechanism for an assignation of the temporal-based weighting of the data feeding an attribute. For example, (in the past/future at X time, the attribute metadata value would be half as valuable). This creates a dependency on parameters extant in the data such as the date the data was created and or source of the data.

Alert value input module 803 (also seen in FIG. 17) comprises an input mechanism for attribute analyst device 515 for a threshold value of an attribute used for configuration to a target scenario object, for example, if some X value is reached of Y attribute then this is considered abnormal and is an indicator of a significant increase in the likelihood of the target scenario. Relative weight input module 804 (also seen in FIG. 17) comprises an input mechanism for attribute analyst device 515 for determining the relative weight of a particular attribute versus another attribute of the target scenario object. In some embodiments a relative weight input module is used to receive a value corresponding to a relative weight of an attribute whereby the target scenario would be affected positively or negatively based on the received value. For example, "rain fall amount" has a 4 relative weight as compared to the "day of week" attribute which has a 1 relative weight.

Figure 9:
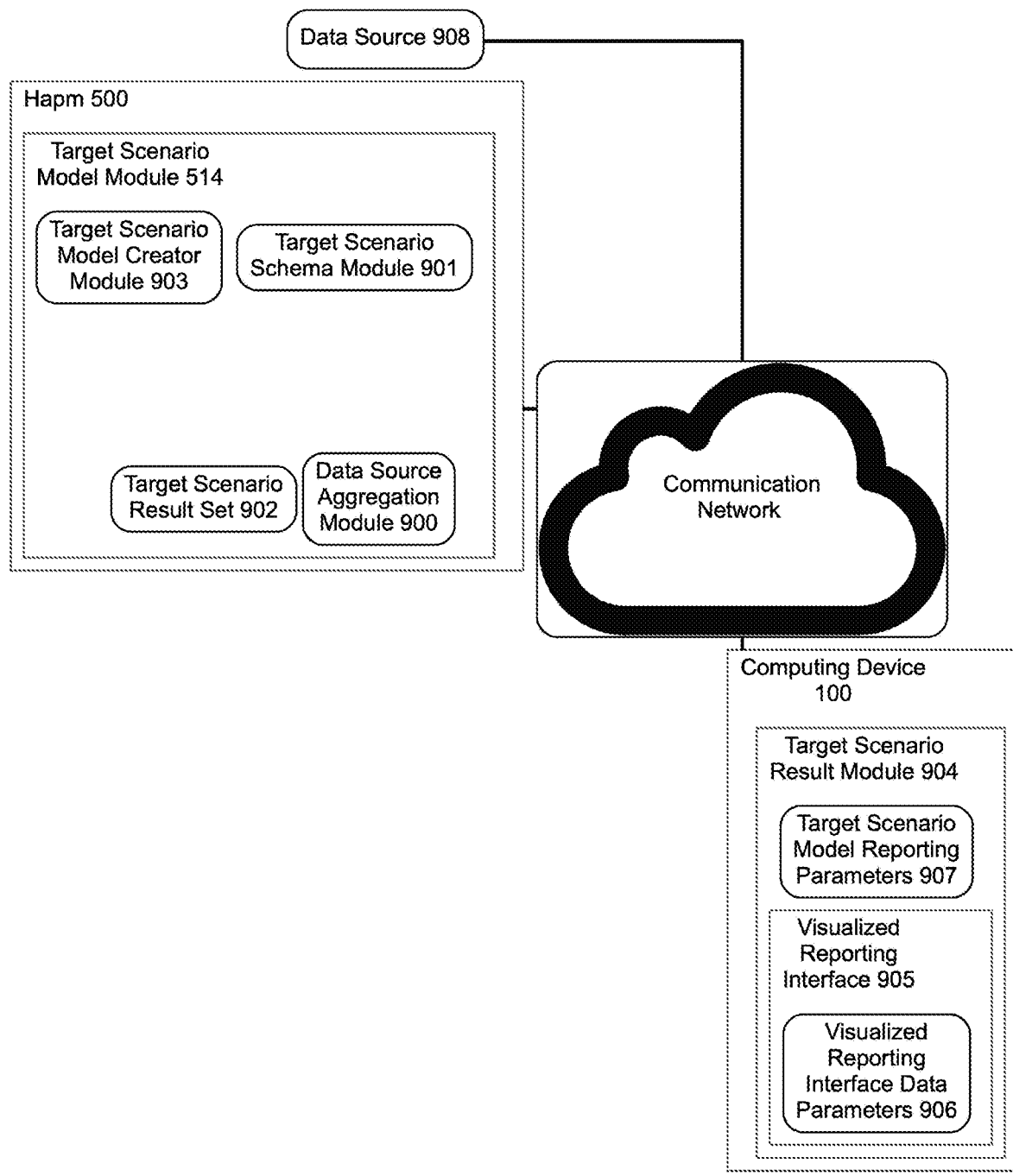
FIG. 9 is a diagram view which shows relationships between modules for the creation of the model and the reporting to computer device.

Referring now to FIG. 9, FIG. 9 is an embodiment of the relationships between modules for the creation of the model and the reporting to computer device. Data source aggregation module 900 comprises a module that interacts with one or more data source 908 and feeds them to the model. Target scenario schema module 901 comprises a module that processes the target scenario object and creates a target scenario schema that allows one or more data sources 908 to connect to the target scenario model. Target scenario result set 902 comprises the result data after a target model has processed data from data source 908.

Target scenario result module 904 comprises a module that process the results of the target scenario model connected to one or more data sources. Target scenario result module 904 preferably comprises visualized reporting interface 905 and target scenario model reporting parameters 907. Target scenario model creator module 903 comprises programming instructions to process the data from the target scenario object and creates a target scenario model.

In some embodiments, a target scenario model creator module 903 may use multi-criteria decision-making methods. In some embodiments, the target scenario model creator module 903 may use a weighted sum model. In other embodiments, the target scenario model creator module 903 may use a weighted product model. In other embodiments, the target scenario model creator module 903 may use an analytic hierarchy process and its variants that could be worked into the model.

In other embodiments, a target scenario model creator module 903 may also apply algorithms for attribute data half-life, missing data, analyst device correlation, and/or attribute confidence. In a preferred embodiment, the data source can specify a "confidence" interval for a specific data point that could affect the output. In yet other embodiments, a target scenario model creator module 903 may also apply algorithms for outcome confidence. In yet other embodiments, a target scenario model creator module 903 may also apply algorithms for trends (of outcome item likelihood and confidence). In a preferred embodiment, a target scenario model creator module 903 may also apply algorithms for nominal & alert thresholds. This may help predict actual outcomes rather than relative outcomes as it pertains to being actionable.

Figure 18:
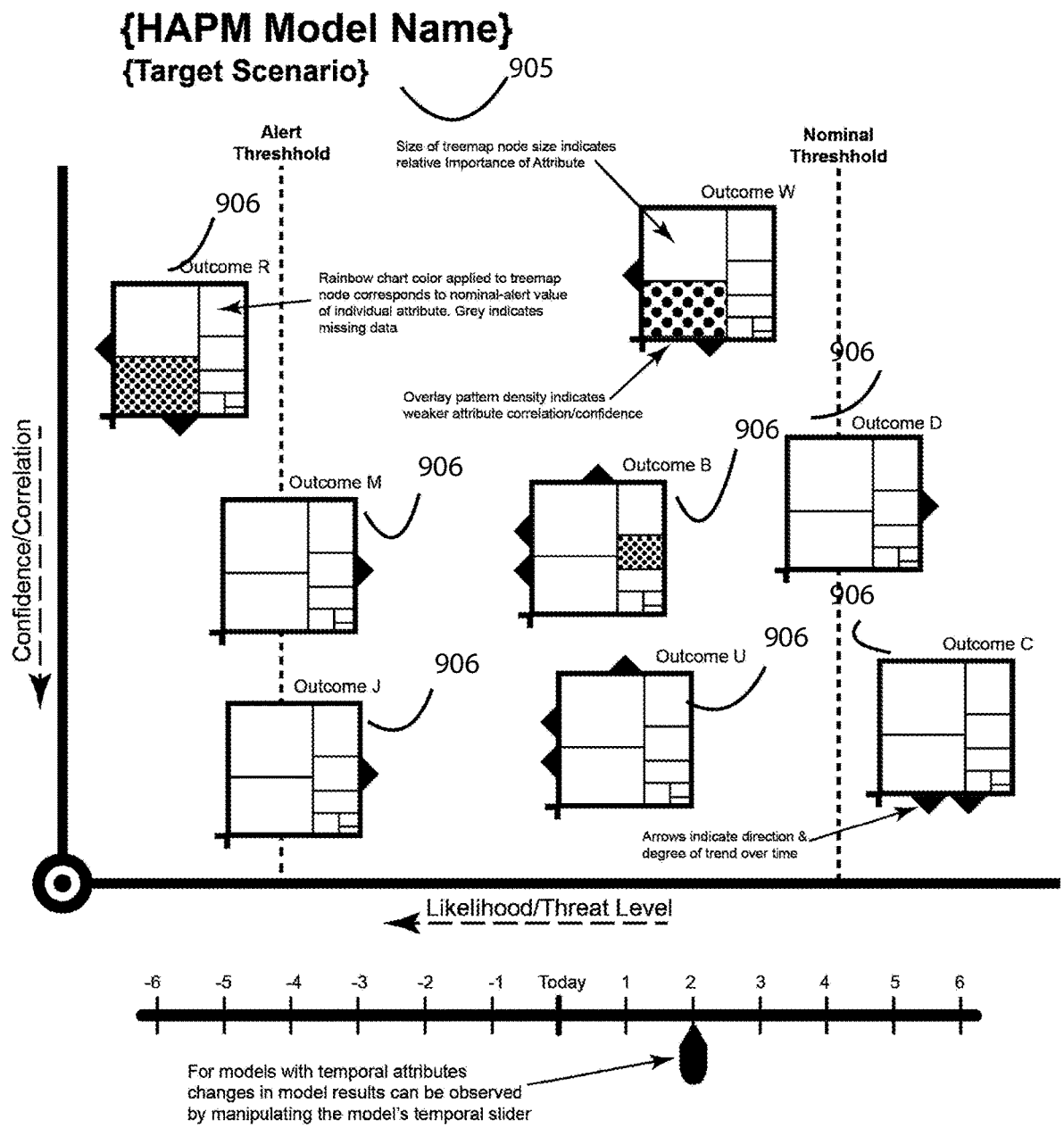
FIG. 18 is an interface view which shows a preferred visualization module for evaluating outcomes, used in some embodiments.

Visualized reporting interface 905 (as also seen in FIG. 18) comprises an interface that displays static or real time interpretations of target scenario result set 902 to be evaluated by one or more interested parties. Visualized reporting interface 905 preferably comprises visualized reporting interface data parameters 906. Visualized reporting interface data parameters 906 (as in FIG. 9 and FIG. 18) comprises an interface that displays static or real time interpretations of a target scenario result set 902 to be evaluated by one or more interested parties. In some embodiments, it is thought that examples of visualized reporting interface data parameters 906 may include: a relative importance of attribute parameter, a likelihood/threat of individual attribute parameter, a correlation/confidence of attribute parameter, a target scenario potential outcome item direction of trend over time for likelihood parameter, a target scenario potential outcome item direction of trend over time for confidence parameter, a target scenario potential outcome item degree of trend over time for likelihood parameter, a target scenario potential outcome item degree of trend over time for confidence parameter, target scenario potential outcome item parameters, or target scenario potential outcome item confidence/correlation parameters.

Target scenario model reporting parameters 907 comprises thresholds and values set to configure a display or report based on evaluating data of target scenario result set. Data source 908 comprises a data store that is where the data has one or more attributes relative to a target scenario object that is used to create target scenario result set 902.

Figure 10:
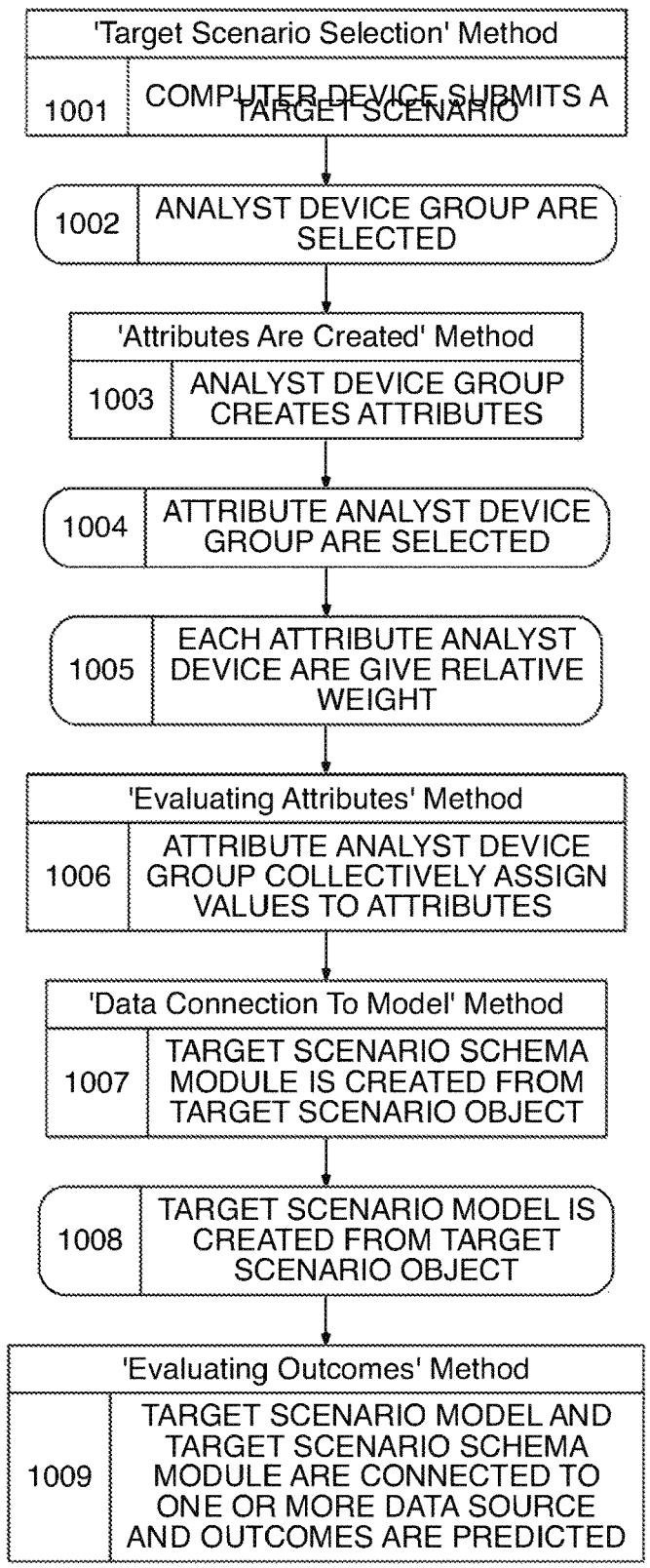
FIG. 10 is a diagram view which shows overall use of the system.

Referring now to FIG. 10, FIG. 10 is a preferred embodiment of the invention is used as follows: First, one or more computer device submits a target scenario to HAPM 500 system (Step 1001). This is further detailed below in (Step 1101-Step 1102).

Figure 11:
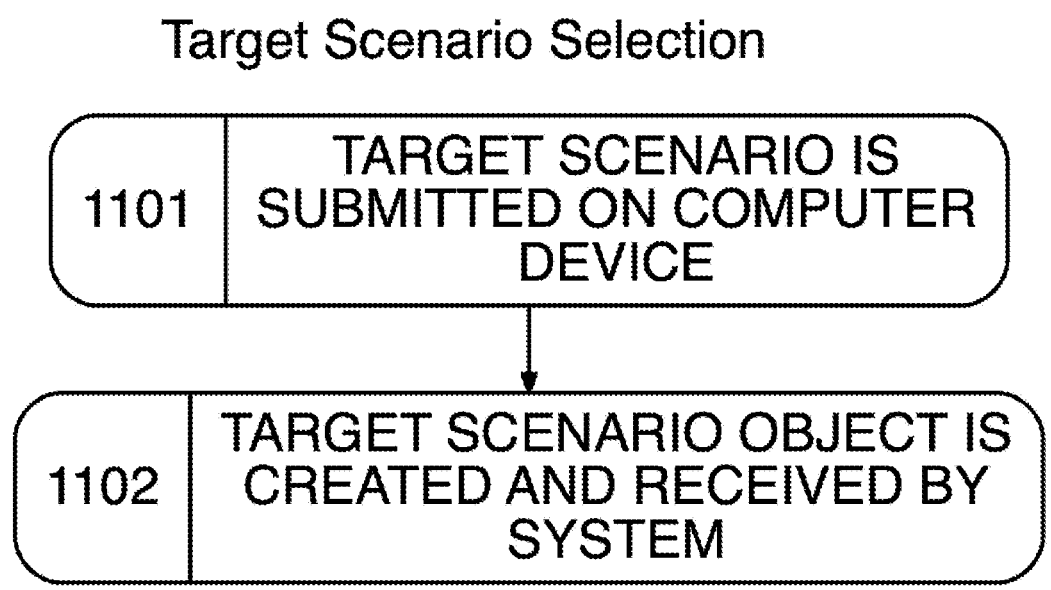
FIG. 11 is a diagram view which shows target scenario selection.

Now referring to FIG. 11, next, a target scenario is submitted into model creation interface module 502 of model creation module 501 on a computer device (Step 1101). Next, target scenario object is created and received by system (Step 1102).

Referring back to FIG. 10, one or more analyst device 516 are selected and configured to associate with the target scenario object (Step 1002). Next, each analyst device 516 may create a collective analyst attribute set that may comprise one or more attributes, and/or one or more attribute metadata values that associate to a target scenario object (Step 1003). This is further detailed below in (Step 1201-Step 1209).

Figure 12:
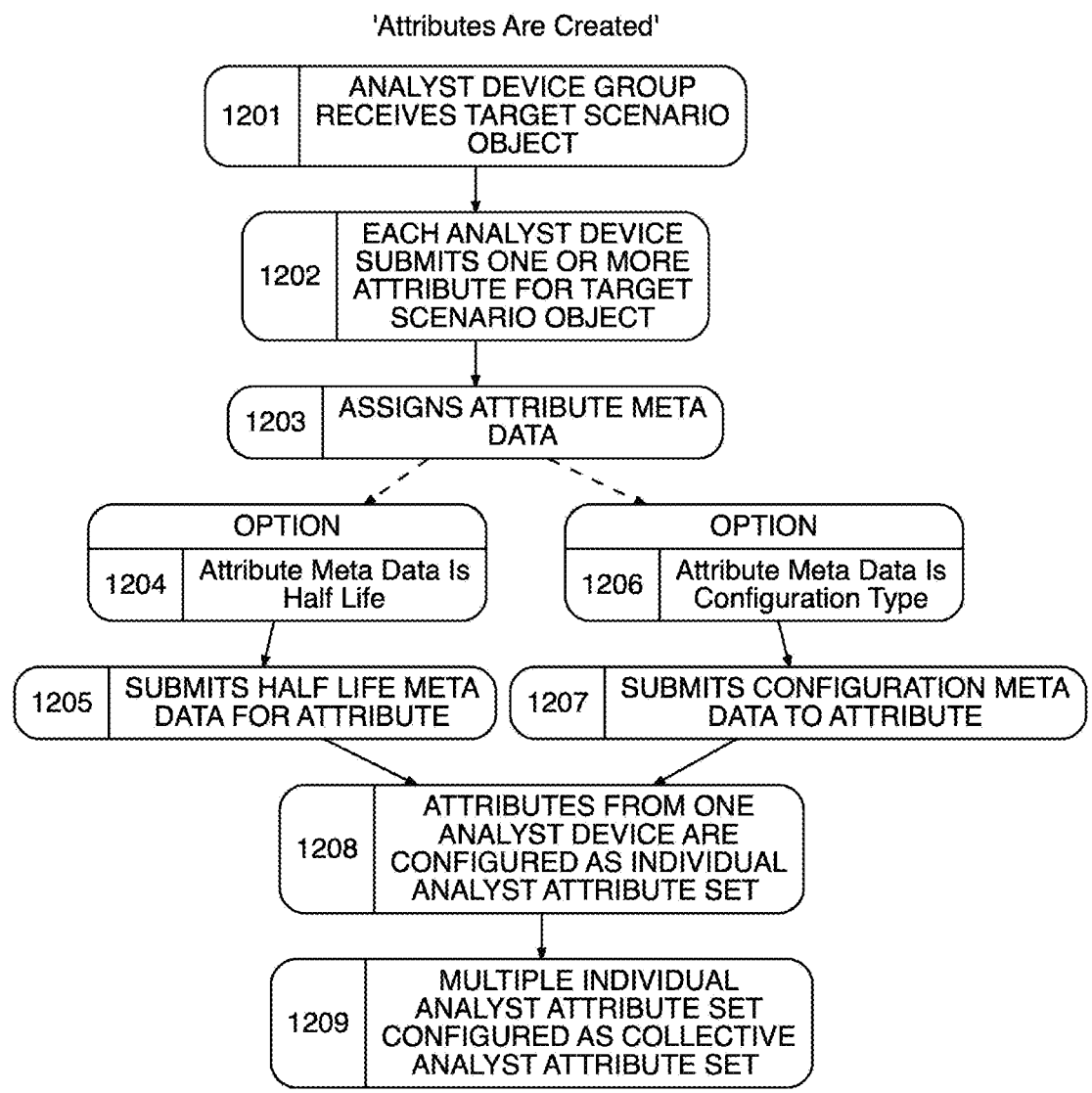
FIG. 12 is a diagram view which shows method for creating attributes.

Now referring to FIG. 12, analyst device group 517 comprising one or more analyst device 516 receives target scenario object (Step 1201). Next, for each analyst device 516, one or more attributes are submitted via analyst interface module 505 of attribute creation module 504 (Step 1202). Next, for each analyst device 516 and for each attribute, attribute metadata are submitted via attribute metadata input module 506 (Step 1203).

If attribute metadata-type is half-life (Step 1204), then, for each analyst device 516 and for each attribute, input is submitted via attribute half-life metadata module 508, for example attribute half-life Boolean module 603 (Step 1205). If attribute metadata are of the configuration type (Step 1206). Then, for each analyst device 516 and for each attribute, input is to a metadata configuration module some embodiments include (but are not limited to), analog attribute module 600, multi-option attribute module 601, or binary attribute module 602 and the like (Step 1207). Next, each attribute (and associated metadata) are configured as an individual analyst attribute set for each analyst device 516 and are received by HAPM 500 (Step 1208). Next, each individual analyst attribute set are configured as a collective analyst attribute set related to a target scenario object (Step 1209).

Referring back to FIG. 10, one or more Attribute analyst device group 518 are selected and configured to associate with the target scenario object (Step 1004). Next, for each attribute analyst device 515 in Attribute analyst device group 518, a relative weight is submitted via analyst relative importance module 512 to the system (Step 1005). Next, for each attribute analyst device in Attribute analyst device group 518 attribute evaluation input is submitted, creating a collective analyst attribute set (Step 1006). This is further detailed below in (Steps 1301-1303).

Figure 13:
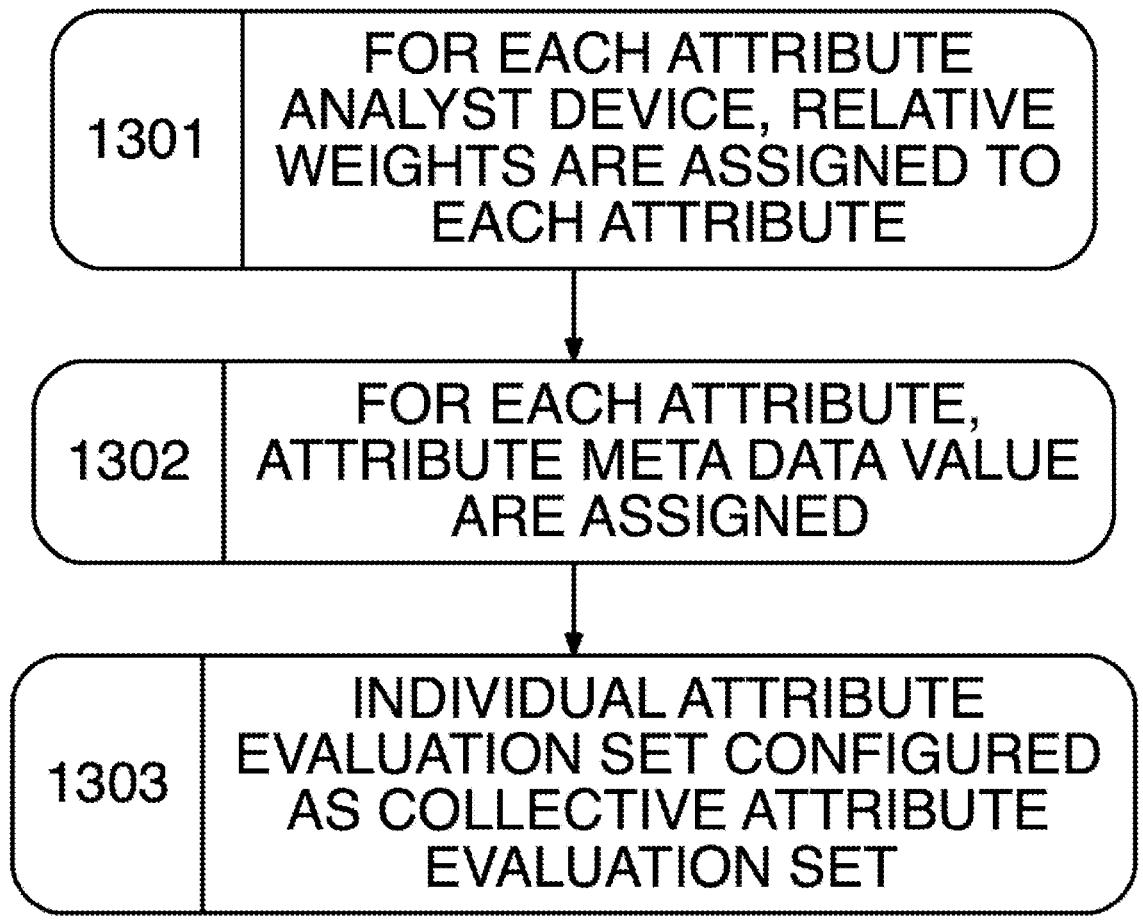
FIG. 13 is a diagram view which shows the method for evaluating attributes.

Now referring to FIG. 13, next, for each attribute analyst device, input is submitted via collected attributes interface module 510 in order to configure relative weights of each attribute (Step 1301). Next, for each attribute of collected attributes interface module 510 data are collected from attribute metadata value module 511 until individual attribute evaluation set 800 is created and submitted to the system. Embodiments of attribute metadata value module 511 include, but are not limited to, nominal value input module 801, half-life value input module 802, a value input module, relative weight input module 804 and the like (Step 1302). Next, each individual attribute evaluation set 800 are configured as collective attribute evaluation set 700 related to the target scenario object (Step 1303).

Referring back to FIG. 10, the system processes the target scenario object (and its associated data) to create target scenario schema module 901 that allows configuration to one or more data source 908 (Step 1007). This is further detailed below in (Step 1401-Step 1402).

Figure 14:
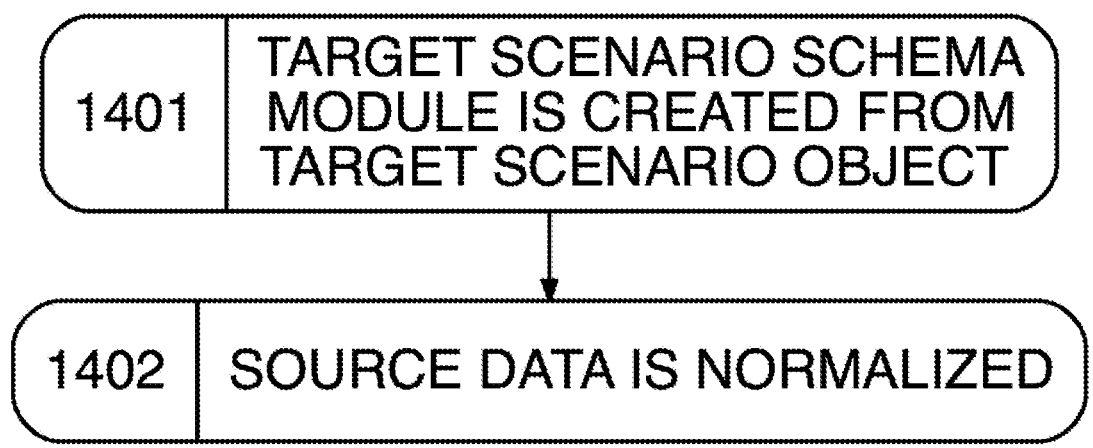
FIG. 14 is a diagram view which shows the data connection to the model.

Now referring to FIG. 14, the system creates target scenario schema module 901 to allow configuration of data source 908 to target scenario model (Step 1401). Next, input data from one or more data source 908 is normalized (Step 1402).

Referring back to FIG. 10, next, the system processes the target scenario object (and its associated data) via target scenario model module 514 and a target scenario model is created (Step 1008). Next, the system predicts likelihood of one or more outcome of a target scenario from processing of data source (Step 1009). This is further detailed below in (Step 1501-Step 1514).

Figure 15:
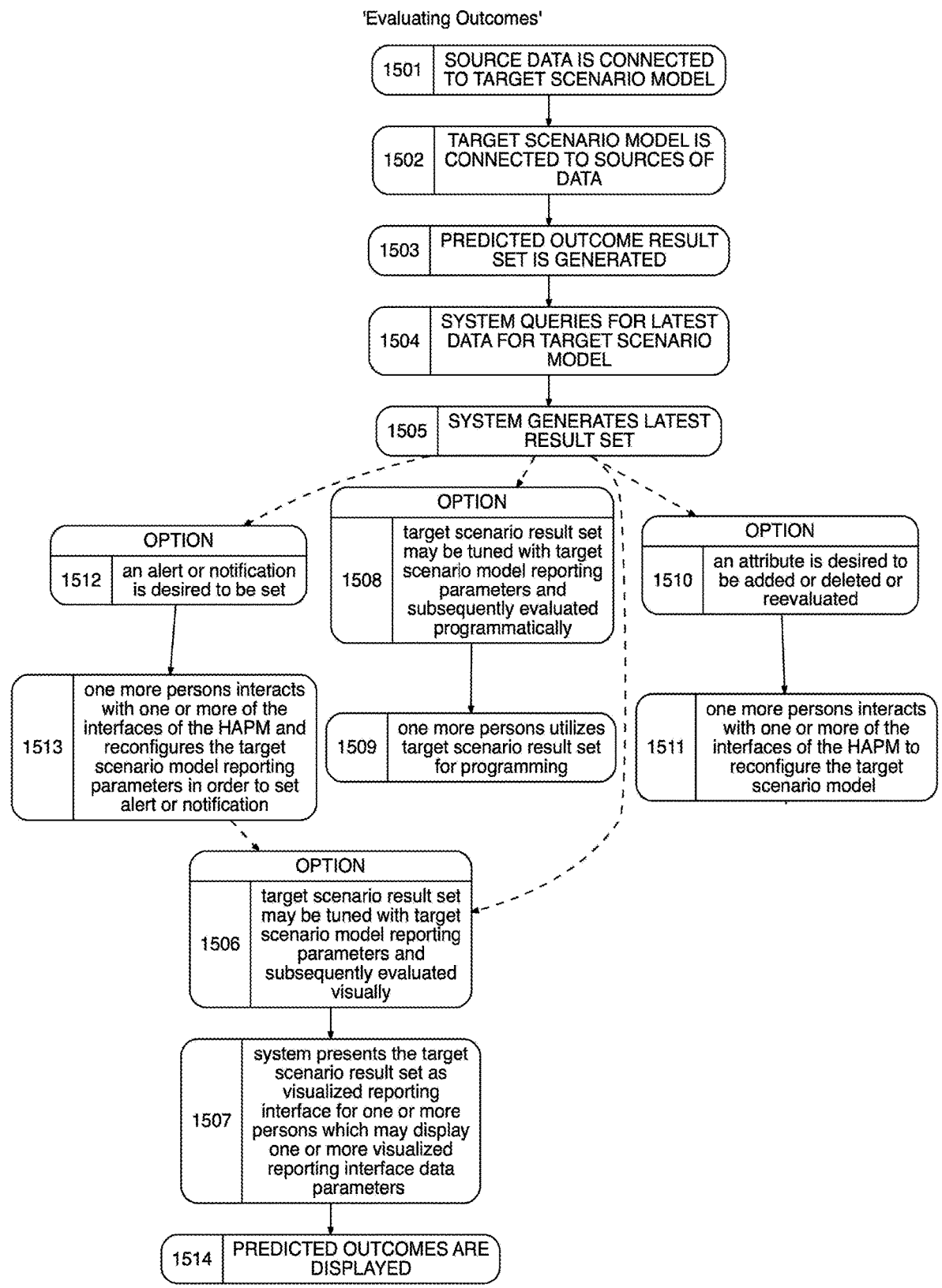
FIG. 15 is a diagram view which shows method for evaluating outcomes.

Now referring to FIG. 15, one or more data source 908 are operably connected to target scenario model via data source aggregation module 900 (Step 1501). Next, target scenario model is connected to one or more data source 908 to generate target scenario result set 902 (Step 1502). Next, one or more target scenario result set 902 is generated (Step 1503). Next, the system queries (static or continually) for normalized input data from one or more data source 908 (Step 1504). Next, the system continuously accepts normalized input data through the target scenario model and iteratively generates target scenario result set 902 which may be processed by target scenario result module 904 (Step 1505).

If target scenario result set 902 is configured with target scenario model reporting parameters 907 it may be evaluated visually (Step 1506). Then, the system presents target scenario result set 902 as visualized reporting interface 905 for one or more persons which may display one or more visualized reporting interface data parameters 906 (Step 1507).

If target scenario result set 902 is configured with target scenario model reporting parameters 907 then it can be subsequently evaluated programmatically (Step 1508). Then, one more persons may utilize the target scenario result set 902 for programming (Step 1509).

If an attribute is desired to be added or deleted or reevaluated (Step 1510), then, one more persons interacts with one or more of the interfaces of HAPM 500 to reconfigure the target scenario model (Step 1511). If an alert or notification is desired to be set (Step 1512) then, one more persons interacts with one or more of the interfaces of HAPM 500 and reconfigures target scenario model reporting parameters 907 in order to set alert or notification (Step 1513). Next, the system presents likelihood of one or more outcome on a display device (Step 1514).

Figure 19:
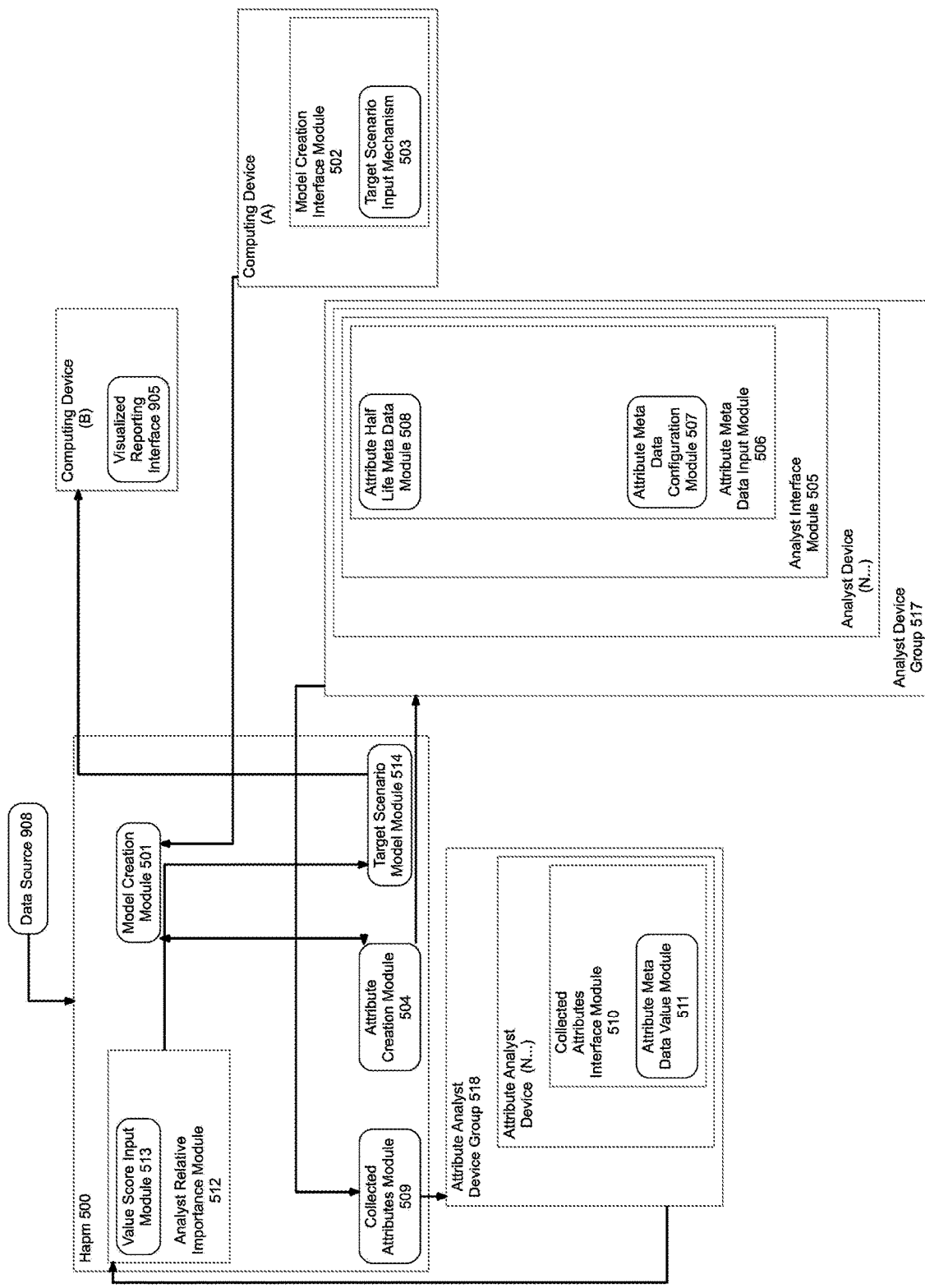
FIG. 19 is a flowchart view which shows the logic flow of the system where in some embodiments, arrows represent preferred communication through a network.

FIG. 19 is a logic flow of the system where in some embodiments, arrows represent preferred communication through a network. The invention may have some elements that are commonly known and other terms defined as specific to this specification. These include: analog attribute, multi-option attribute, attribute analyst device 515, target scenario model, binary attribute, data source 908, analyst device 516, attribute, analyst device group 517, Attribute analyst device group 518, collective analyst attribute set, individual analyst attribute set, target scenario, target scenario object, one or more computing device 100, one or more CPU 101, one or more processor 102, one or more local memory 103, one or more interface 104, one or more physical ports, one or more independent processor, one or more interface memory, one or more NIC, one or more busses, one or more memory 200, one or more nonvolatile memory 400, one or more storage devices 201, one or more input devices 202, one or more keyboard 300, one or more touchscreen, one or more microphone, mouse 301, touchpad, trackball, one or more input output units 401, one or more operating systems 203, one or more output devices 204, one or more real time clock 402, one or more power supply 403, one or more power source 404, one or more program instructions, distributed computing network 302, one or more client application 205, one or more client 303, one or more server 304, one or more external service, one or more shared services 206, one or more database 305, one or more security system, configuration system 306, one or more remote memory 105, one or more system server, and one or more communications network 106. However, their use and relationships to the novel components and steps of the invention render them applicable herein. In order to preface the roles that they play in the specification, they are subsequently explained here. An analog attribute comprises an attribute whose value can be represented by a numeric scale. A multi-option attribute comprises an attribute whose value can be one of a defined number of choices. A target scenario model comprises a processing algorithm which incorporates the data of a target scenario object, for example the relative weights of one or more attributes, the attributes, the types of meta-data for accepting data and outputting likelihood of outcomes related to a target scenario. In some embodiments, prediction data may be formatted into a data object for the programmatic use of the data object by a second computing device. In this regard, the second computing device may access the data through an application programming interface (API). A binary attribute comprises an attribute that is designated as true/false. An attribute comprises a data property configured as part of a target scenario object. A collective analyst attribute set comprises one or more individual analyst attribute set that is configured to a target scenario object.

An individual analyst attribute set comprises the collected attributes and metadata that analyst device 516 configures to a target scenario object. A target scenario comprises an input scenario to HAPM 500 that where one desires to know "which" of a number of possible outcomes is more likely to occur (of N number of outcomes). For example, "What are the chances there is a terrorist attack during weekend NFL games?" In some embodiments, (but not limited to) this input scenario may be "if" a particular outcome may occur or not. A target scenario object comprises a data object configured to hold the information of a target scenario and the subsequently associated data that allows the prediction of the likelihood of different outcomes of a target scenario.

In some embodiments, an example of an independent processor could be an audio processor or a video processor and the like. In some embodiments, an independent processor serves to allow communication with appropriate media. In some embodiments, an example of an interface memory may include volatile and/or non-volatile memory (e.g., RAM) and the like. NIC comprises a computer hardware component that connects a computer to a computer network.

Busses comprises a communication system that transfers data between components inside a computer, or between computers. Program instructions comprises a mechanism for control execution of system, or comprise of an operating system, and/or one or more applications. In some embodiments, examples of program instructions may include: an object code, a code produced by a compiler, a machine code, a code produced by an assembler or a linker, a byte code, a code executed using an interpreter, or a code on local memo. In some embodiments, program instructions may serve to communicate with a plurality of other computing devices, such as clients or servers, over communications networks. In yet other embodiments, a program instructions may also serve to implement the system and/or methods of the present invention. In yet other embodiments, program instructions may be modules that may exist in different memory stores, or devices and perform comparable functions, though in different physical locations. Additionally, in other embodiments, programming instructions (and modules that comprise them), may reside on many types of memory 200, including but not limited to, nonvolatile memory 400, local memory 103, interface memory, or storage devices 201. An external service comprises web-enabled services or functionality related to or installed on computing device 100 itself which may be deployed on one or more of a particular enterprise's or user's premise.

A security system comprises a system common to information technology (IT) and web functions that implements security related functions for the system. In some embodiments, a system server serves to communicate with a plurality of other computing devices, such as clients or servers, over communications networks.

The skilled person will be aware of a range of possible modifications of the various embodiments described above. Accordingly, the present invention is defined by the claims and their equivalents.

What is claimed is:

1. A system for predictive modeling comprising:
a network-connected predictive modeling computer comprising at least a memory and a processor and further comprising programmable instructions stored in the memory and operating on the processor, the instructions, when executed by the processor, cause the processor to predict a likelihood of an outcome for a target scenario comprising:
a model creation module;
an attribute creation module;
a collected attributes module;
a target scenario model module;
a plurality of connections to one or more data sources;
an analyst relative importance module;
wherein the target scenario comprises input to the system of a scenario with a plurality of possible outcomes;
wherein the model creation module comprises programming instructions to manage a creation of a target scenario object, the target scenario object comprising data configured to hold the information of a target scenario and associated data;
wherein the attribute creation module comprises programming instructions that manage the creation of one or more attributes configured to the target scenario object;
wherein the collected attributes module comprises programming instructions that configure metadata values to one or more of the attributes to the target scenario object;
wherein the target scenario model module comprises programming instructions to create a target scenario model configured to connect to the one or more data sources resulting in one or more predictions related to the target scenario;
wherein the attribute creation module is further configured to receive one or more attribute data values from one or more analyst devices, each analyst device comprising a computing device with programming instructions that manages a creation of one or more of the attributes that are configured to the target scenario object;
wherein the collected attributes module is further configured to receive metadata values from one or more attribute analyst devices, each attribute analyst device comprising at least a memory and a processor and further comprising programming instructions to set one or more values of the metadata values for the one or more of attribute data values;
wherein the analyst relative importance module comprising programming instructions for receiving a relative weight of strength of at least one of the metadata values;
wherein the attribute creation module comprises an analyst interface module, wherein the analyst interface module comprises programming instructions running on a first analyst device, the programming instructions configured to create the one or more attributes;
wherein the analyst interface module further comprises an attribute half-life metadata module, wherein the attribute half-life metadata module comprises programming instructions configured to allow a designation of an elapsed time or a future time wherein a first attribute value is half as valuable for predicting an outcome of the target scenario.

2. The system of claim 1, wherein the analyst interface module further comprises an attribute metadata configuration module, wherein the attribute metadata configuration module comprises programming instructions configured to allow a designation of a data type for each of the one or more attribute data values.

3. The system of claim 1, wherein the first attribute value is received from the one or more data source.

4. The system of claim 1, wherein the collected attributes module further comprises a collected attributes interface module, the collected attributes interface module comprising programming instructions running on a first attribute analyst device to assign values to the one or more attributes.

5. The system of claim 4, wherein the collected attributes module is configured to receive one or more individual attribute evaluation sets, wherein the one or more individual attribute evaluation sets each comprises a collection of the assigned values from a first attribute analyst device.

6. The system of claim 1, wherein the target scenario model module further comprises a target scenario model creator module, wherein the target scenario model creator module comprises programming instructions configured to process data from the target scenario object and create a target scenario model.

7. The system of claim 6, wherein the target scenario model module further comprises a data source aggregation module, wherein the data source aggregation module comprises programming instructions configured to interact with the one or more data sources and feeds them into the target scenario model.

8. The system of claim 7, wherein the target scenario model module further comprises a target scenario schema module, wherein the target scenario model module comprises programming instructions configured to create a target scenario schema that allows the one or more data source to connect to the target scenario model.

9. The system of claim 8, wherein the target scenario model module further comprises a target scenario result module wherein the target scenario result module comprises programming instructions configured to process results of the target scenario model connected to the one or more data sources for a prediction of one or more outcomes for the target scenario.

10. The system of claim 9, wherein the target scenario result module is further configured to send prediction data to a visualized reporting interface, the visualized reporting interface comprising programming instructions configured to display static or real-time predictions for the one or more outcomes.

11. A method for predictive modeling comprising:
a network-connected predictive modeling computer comprising at least a memory and a processor and further comprising programmable instructions stored in the memory and operating on the processor, the instructions adapted to a system for predicting the likelihood of an outcome for a target scenario comprising the steps of:
inputting target scenario data and configuring the target scenario data to a target scenario object;
sending a target scenario object to one or more analyst devices;
receiving one or more attributes from at least one analyst device of the one or more analyst devices and configuring the one or more attributes to the target scenario object;
sending a target scenario object to one or more attribute analyst devices;
receiving, at the target scenario object, one or more attribute values from the one or more attribute analyst devices;
creating a target scenario model from the target scenario object;
receiving data, at the target scenario model, from one or more data sources;
creating prediction data from the target scenario model;
sending the prediction data to a computing device;
wherein the target scenario data comprises input to the target scenario object of a scenario with a plurality of possible outcomes;
wherein the target scenario object comprises the target scenario data and associated data;
wherein the one or more analyst devices each comprise programming instructions configured to manage a creation of one or more of the attributes that are configured to a target scenario object;
wherein the one or more attributes comprise a data property configured as part of the target scenario object;
wherein the attribute analyst device comprises a computing device with programming instructions configured to set the value of metadata for the one or more attributes;
wherein the one or more attribute values are value assignations of one or more attributes from the target scenario object;
wherein the target scenario model comprises programming instructions configured to incorporate the data property of a target scenario object and to output a likelihood of outcomes related to the target scenario data;
wherein the one or more data sources each comprise a data store and has the one or more attributes within the target scenario object.

12. The method of claim 11, further comprising the step of receiving one or more analyst relative weights and configuring the analyst relative weights to the target scenario object;
wherein the analyst relative weights are an associated relative weight of the strength of the one or more attribute values.

13. The method of claim 12, further comprising the step of creating a target scenario schema from the target scenario object;
wherein the target scenario schema is a data schema comprising the one or more attributes for configuring the one or more data sources to the target scenario model.

14. The method of claim 13, further comprising the step of displaying the prediction data at a reporting interface on the computing device.

15. The method of claim 13, further comprising the step of compiling the prediction data into a data object for the programmatic use of the data object by a second computing device.

* * * * *